March 7, 1961 R. F. ARNESEN 2,974,287

BALANCED DISCRIMINATORS

Filed Nov. 28, 1958

INVENTOR
ROBERT F. ARNESEN

BY N. Vincent Harsha
ATTORNEY

United States Patent Office 2,974,287
Patented Mar. 7, 1961

2,974,287

BALANCED DISCRIMINATORS

Robert F. Arnesen, Needham Heights, Mass., assignor to Raytheon Company, a corporation of Delaware Filed Nov. 28, 1958, Ser. No. 777,019

5 Claims. (Cl. 329—138)

Figure 1:
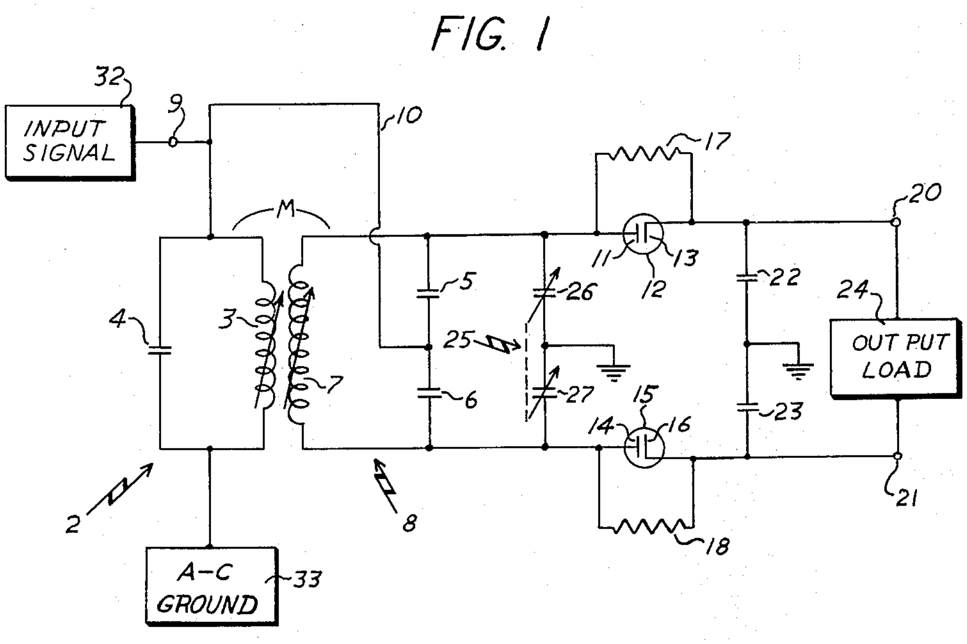

This invention relates generally to discriminator circuits and, more particularly, to balanced discriminator circuits that may be very easily adjusted to provide a predetermined characteristic output curve.

Prior art discriminator circuits generally have two predominant disadvantages. A first disadvantage arises in circuits where great accuracy in setting the slope of the discriminator characteristic curve is desired. It has not always been possible to obtain a response curve to meeet very close tolerances. For that reason, in many applications where relatively large errors may be tolerated, it has often been more economical to accept whatever characteristic curve is obtained from using nominally correct circuit component values without spending additional time to adjust and select components more carefully in order to reduce the inaccuracies which may be present. However, in circumstances where it has been necessary to fit relatively close tolerances, resistive or capacitive elements are often added in appropriate places in the circuit to adjust the slope as closely as possible. These added elements are usually selected on a trial and error basis and require additional wiring and soldering. Excessive soldering adds to the danger of damaging the components and often, upon cooling, component values change and make it very difficult to obtain the correct characteristic curves in sensitive circuits.

A second disadvantage may occur in manufacturing discriminator circuits in relatively large quantities on a production basis wherein it is desirable to obtain substantially identical characteristics from unit to unit so that consistent results may be obtained in their application. Often, it has been necessary to experiment extensively with the physical location as well as the values of circuit elements in order to provide response curves for all units that match a predetermined desired slope. The placement of the circuit elements is liable to become quite critical when units are designed for high frequency operation.

The time consumed in using such inefficient trial and error methods and in performing suitable tests to evaluate the effect of each of the changes as they are made creates unwarranted delays and correspondingly increased production expenses. Especially, when the frequencies involved are of the order of 10 mc. or higher, it has been found that costly hours must be expended in properly selecting, wiring and locating components to match the required response curves. Another disadvantage of prior art circuits may occur because changes in circuit components often interact so as to cause undesirable changes in the cross-over frequency of the discriminator characteristic curve.

This invention, however, provides a circuit which can be easily adjusted on a production basis to fit close tolerances and to obtain substantially identical characteristic curves from one unit to another without requiring excessive time and expense for component changes or for evaluation testing. The invention utilizes a differential capacitor placed in the transformer secondary of the discriminator input circuit. A simple adjustment of the differential capacitor allows the slope of the discriminator characteristic curve to be set within extremely close tolerances. The adjustment may be accomplished without causing any undesirable change in the preselected cross-over frequency. The ease with which the adjustment can be made eliminates the necessity for laborious trial and error methods and greatly reduces the time necessary to set up the required characteristic curve.

Another advantage in this invention arises in applications where it is desirable to reverse the polarity of the discriminator output curve. The setting of the relative values of the capacitances of the differential capacitor can be arranged to accomplish this reversal without additional rewiring or substitution of any of the circuit elements.

Figure 2:
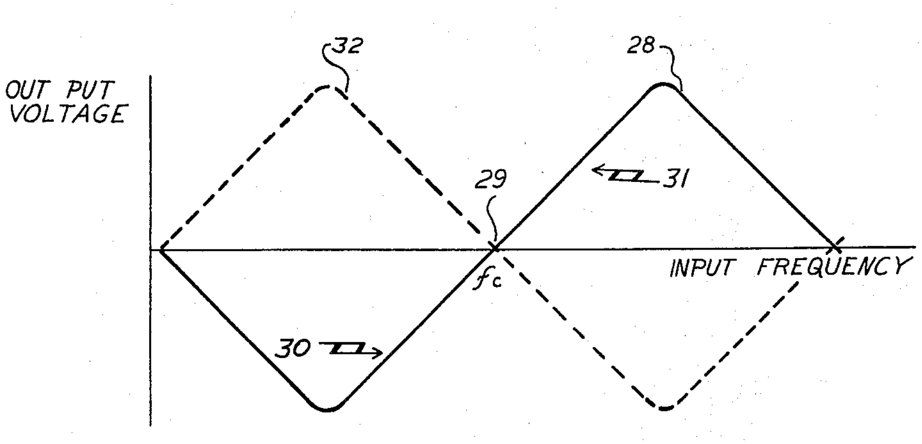

The invention may be most easily described with the help of the accompanying drawing in which:

Fig. 1 shows a circuit representing a particular embodiment of the invention; and Fig. 2 shows typical curves of output voltage v. input frequency for the discrminator of the invention.

Referring to Fig. 1, an input terminal 9 of the discriminator circuit is connected to a source 32 of a variable frequency input voltage. For example, terminal 9 may be connected to the plate of a limiter tube or to the output of an I.F. amplifier stage. One side of a primary resonant circuit 2, having a variable inductance 3 and a capacitance 4 in parallel, is also connected to input terminal 9 of the discriminator circuit. The other side of resonant circuit 2 is connected to a reference point 33 for A.-C. ground. If the input circuit to which terminal 9 is connected is, for example, the plate of a tube, reference point 33 may be a source of B+ voltage. A secondary resonant circuit 8 has a variable inductance 7 shunted by a pair of series connected capacitors 5 and 6. The junction point of capacitors 5 and 6 is connected directly to input terminal 9 through a conductor 10. Inductances 3 and 7 are of the variable type utilizing adjustable iron cores. These inductances provide a transfer of energy due to transformer action, inductance 3 acting as a primary and inductance 7 acting as a secondary.

The junction of capacitor 5 and inductance 7 is connected to the plate 11 of a diode 12, cathode 13 of which is connected to an output terminal 20. The junction point of capacitor 6 and inductance 7 is connected to plate 14 of a diode 15, cathode 16 of which is connected to a second output terminal 21. A resistor 17 is connected in shunt with diode 12 from plate 11 to cathode 13. A resistor 18 is connected in shunt with diode 15 from plate 14 to cathode 16. A capacitor 22 is connected from output terminal 20 to ground and a capacitor 23 is connected from output terminal 21 to ground. Output terminals 20 and 21 are connected to an output load circuit 24. Output load circuit 24 may be, for example, an A.-F.-C. circuit, an audio amplifier, or any other suitable load appropriate for the application desired.

A differential capacitor 25 is connected across secondary circuit 8 between plates 11 and 14 of diodes 12 and 15, respectively. As shown in Fig. 1, differential capacitor 25 is made up of capacitor 26 and capacitor 27, with the junction point of capacitors 26 and 27 being connected to ground. The configuration as shown in the figure should be construed as only a schematic representation of such a unit. It is to be understood that the differential capacitor may be constructed in any appropriate manner. Often, such components may be constructed as single units. Whatever physical structure is used for differential capacitor 25, the capacitances of capacitors 26 and 27 are always arranged to vary simultaneously and in opposite directions. For example, if the capictance of capacitors 26 increases by a particular amount, the capacitance of capacitor 27 decreases by the same amount, and vice versa.

The basic operation of the circuit shown in the drawing is similar to that of the Foster-Seeley type of discriminator in that the circuit of the invention provides an output voltage variation in response to an input frequency variation by utilizing the phase shift operation of the secondary resonant circuit. If the instantaneous frequency of the input signal is equal to the frequency to which the resonant circuits 2 and 8 are tuned, the phase of the inductively coupled signal applied to diode 12 will be shifted 90° in one direction with respect to that of the reference, or directly coupled, signal and the phase of the signal applied to diode 15 will be shifted 90° in the opposite direction with respect to that of the reference signal. The rectified voltages appearing across the output terminals due to the rectifying action of each diode will be equal and 180° out of phase. The rectified voltages thereby cancel and a zero output voltage results across terminals 20 and 21.

If, however, the instantaneous frequency of the incoming signal is different from that of the signal to which the resonant circuits are tuned, the voltage applied to diode 12 is phase shifted by a greater or lesser amount than that applied to diode 15 depending on the direction of the input frequency variation. Under these conditions the rectified voltages do not cancel and an output voltage results. The value and polarity of the resulting output voltage depends on the amount and the direction of the frequency change of the input signal about the frequency of the carrier signal.

A typical conventional curve 28 of voltage output v. frequency input can be drawn for a particular range of frequency variation as shown in Fig. 2. In that figure, the cross-over point 29 represents the point at which the voltage output is substantially zero. If the instantaneous input frequency is less than the cross-over frequency $f_c$, the voltage output is negative, as at the left hand portion 30 of the curve. If the instantaneous input frequency is greater than the cross-over frequency, the voltage output is positive, as at the right hand portion 31 of the curve.

It is desirable that the slope of the curve (ratio of output voltage deviation to input frequency deviation) be linear and have a predetermined value for particular applications. As discussed previously, if a large number of units are made using the same nominal component values, differences in slope characteristics occur from unit to unit in conventional discriminator circuits. Even though exact calculations theoretically can be made to determine the correct values of circuit elements to be used, stray capacitances and other undesirable residual effects, which arise because of inherent properties of the elements used, cause the actual response curves to differ from the calculated curves. In order to adjust the curve of each unit to a desired preselected slope within close tolerances, it has been necessary in prior art circuits to change one or more of the circuit elements or to insert additional elements. Sometimes, for example, the primary resonant circuit is loaded by placing a resistor in parallel with the inductance and capacitance elements. In some cases, attempts have been made to use bifilar inductances, dual windings, or dual slug tuning for the secondary inductance. Stray unbalances have sometimes been alleviated by using a capacitance across one of the diodes. However, such attempts have proved expensive and sometimes unsuccessful in solving the problem. Numerous trials are usually necessary before elements having the required values are found. In addition, the correct setting of the slope of the curve resulting from a change or addition of circuit elements is sometimes accompanied by an undesirable change in the cross-over frequency of the curve as well. In many cases, it has been more economical to accept inaccurate response curves rather than consume valuable production time in attempting to obtain better results. As previously stated, however, if it is necessary to maintain close production tolerances, such time-consuming changes are required with prior art circuits.

In the circuit of the invention, however, a single adjustment of the differential capacitor allows the slope of the output response curve to be set to any desired value within tolerances as close as can be reasonably measured. As the differential capacitor is varied, the slope of the output curve increases or decreases depending on the direction in which the relative values of capacitance change. If the differential capacitor is varied so that the slope of curve 28 approaches infinity, the output voltage reduces to zero. Eventually, the output voltage passes through zero and, as the differential capacitance is further varied in the same direction, the output voltage increases and the polarity of the output voltage reverses with respect to the value of the input frequency, as shown, for example, by dashed curve 32 in Fig. 2. Thus, the adjustmnet of the slope and the polarity of the discriminator output curve can be accomplished by only a single control. Provided that the circuit is tuned to resonance with the differential capacitor set substantially near its cross-over capacitance (where the capacitances of capacitors 26 and 27 are substantially equal), the cross-over frequency $f_c$ is not substantially affected by changes in the differential capacitor setting.

Because of the ease of adjustment, testing time of each unit can be considerably reduced and substantial savings in production costs may be realized.

Other variations in the basic circuit of the invention may occur to those skilled in the art without departing from the scope of this invention. For example, in some applications it may be desirable to add a temperature compensating capacitor across the secondary inductance of the input circuit. Crystal rectifiers may be utilized as well as the diodes shown in the drawing. The output circuit may be varied according to the application desired. For example, the cathode of diode 15 may be grounded and the ground at the junction of capacitors 22 and 23 may be removed. Capacitors 22 and 23 may then be replaced by a single capacitor and the output voltage, thus, can be applied to an output load that is grounded on one side. It may be desirable to alter the peak frequency deviation or the peak output voltage within reasonable limits depending upon the application desired. For example, in A.-F.-C. circuits it is usually desirable to obtain a maximum slope to obtain the best sensitivity in response. For other applications, it may be desirable to obtain maximum frequency coverage and, thus, to increase the peak frequency deviation. Combinations of such variations may be obtained by varying the primary or secondary loading simultaneously with the variation in differential capacitance. Hence, the invention is not to be construed as limited by the particular details of the embodiment described herein except as defined by the appended claims.

What is claimed is:

1. A discriminator circuit comprising, in combination, resonance means adapted to be connected to an input signal source, said input signal having a variable frequency; rectifying means connected to said resonance means for providing an output signal to voltage of which is proportional to the frequency of said input signal; a differential reactance means including a pair of reactance elements each having a terminal connected to opposite ends of said resonance means and having a common terminal connected to a reference point for controlling the response of said output voltage to said input frequency.

2. A discriminator circuit comprising, in combination, a first resonant circuit adapted to be connected to an input signal source, said input signal having a variable frequency; a second resonant circuit including a first reactance means directly connected to said first resonant circuit and a second reactance means inductively coupled to said first resonant circuit; rectifying means connected to said second resonant circuit for providing an output signal the voltage of which is proportional to the frequency deviation of said input signal; a differential capacitance means including a pair of capacitance elements each having a terminal connected to opposite ends of said second resonant circuit and having a common terminal connected to a reference point for controlling the response of said output voltage to said input frequency deviation.

3. A discriminator circuit comprising, in combination, a first resonant circuit adapted to be connected to an input signal source, said input signal having a variable frequency; a second resonant circuit including capacitance means directly connected to said first resonant circuit and a variable inductance means inductively coupled to said first resonant circuit; rectifying means connected to said second resonant circuit for providing an output signal the voltage of which is proportional to the frequency of said input signal; a differential capacitance means including a pair of capacitance elements each having a terminal connected to opposite ends of said second resonant circuit and having a common terminal connected to a reference point for controlling the response of said output voltage to said input frequency.

4. A discriminator circuit comprising, in combination, resonance means adapted to be connected to an input signal source, said input signal having a variable frequency; rectifying means connected to said resonance means for providing an output signal the voltage of which is responsive to the frequency of said input signal, said response being capable of representation by a substantially linear curve over a predetermined frequency range; a differential reactance means including a pair of reactance elements each having a terminal connected to opposite ends of said resonance means and having a common terminal connected to a reference point for adjusting the slope of said curve.

5. A discriminator circuit comprising, in combination, a first resonant circuit tuned to a predetermined frequency and connected to an input signal source, said input signal having a variable frequency; a second resonant circuit including a variable inductance in parallel with a pair of series capacitors, said variable inductance being inductively coupled to said first resonant circuit and the junction of said series capacitors being directly connected to said first resonant circuit; a pair of diode rectifiers connected to and responsive to the output of said second resonant circuit for providing an output signal the voltage of which is equal to zero when the frequency of said input signal is equal to said predetermined frequency and non-zero when said input signal deviates from said predetermined frequency, said response being capable of representation by a substantially linear curve of output voltage versus input frequency over a predetermined frequency range; a differential capacitor including a pair of capacitance elements each having a terminal connected to opposite ends of said second resonant circuit and having a common terminal connected to a reference point circuit for adjusting the slope and polarity of said curve.

References Cited in the file of this patent

UNITED STATES PATENTS

| | | |
|---|---|---|
| 2,412,039 | Fyler | Dec. 3, 1946 |
| 2,479,208 | Byrne et al. | Aug. 16, 1949 |
| 2,520,621 | Beers | Aug. 29, 1950 |

UNITED STATES PATENT OFFICE

CERTIFICATION OF CORRECTION

Patent No. 2,974,287 March 7, 1961

Robert F. Arnesen

It is hereby certified that error appears in the above numbered patent requiring correction and that the said Letters Patent should read as corrected below.

Column 4, line 64, for "to voltage" read -- the voltage --; column 6, line 27, strike out "circuit".

Signed and sealed this 25th day of July 1961.

(SEAL)
Attest:

ERNEST W. SWIDER
Attesting Officer

DAVID L. LADD
Commissioner of Patents